United States Patent
Eriksson et al.

(10) Patent No.: US 9,624,807 B2
(45) Date of Patent: *Apr. 18, 2017

(54) METHOD PERTAINING TO AIR REMOVAL FROM A LIQUID SUPPLY SYSTEM AND A LIQUID SUPPLY SYSTEM

(75) Inventors: Lars Eriksson, Järna (SE); Ulf Carlsson, Södertälje (SE)

(73) Assignee: SCANIA CV AB (SE)

(*) Notice: Subject to any disclaimer, the term of this patent is extended or adjusted under 35 U.S.C. 154(b) by 0 days.

This patent is subject to a terminal disclaimer.

(21) Appl. No.: 13/806,213

(22) PCT Filed: Jun. 20, 2011

(86) PCT No.: PCT/SE2011/050790
§ 371 (c)(1),
(2), (4) Date: Jan. 24, 2013

(87) PCT Pub. No.: WO2011/162693
PCT Pub. Date: Dec. 29, 2011

(65) Prior Publication Data
US 2013/0126000 A1 May 23, 2013

(30) Foreign Application Priority Data
Jun. 21, 2010 (SE) ........................ 1050641

(51) Int. Cl.
*F01N 9/00* (2006.01)
*F01N 3/20* (2006.01)
(Continued)

(52) U.S. Cl.
CPC ................ *F01N 9/00* (2013.01); *F01N 3/10* (2013.01); *F01N 3/2066* (2013.01); *F01N 11/00* (2013.01);
(Continued)

(58) Field of Classification Search
CPC ................ F04B 49/022; F04B 2205/05; F04B 2205/503; F04C 28/065; F01N 2610/14;
(Continued)

(56) References Cited

U.S. PATENT DOCUMENTS

| | | | |
|---|---|---|---|
| 5,606,856 A | 3/1997 | Linder et al. | 60/286 |
| 5,794,667 A | 8/1998 | Payne et al. | 141/128 |

(Continued)

FOREIGN PATENT DOCUMENTS

| | | |
|---|---|---|
| DE | 199 47 197 A | 4/2001 |
| DE | 10 2009 056 181 A1 | 6/2001 |

(Continued)

OTHER PUBLICATIONS

International Search Report dated Oct. 11, 2011 issued in corresponding international patent application No. PCT/SE2011/050790.
(Continued)

*Primary Examiner* — Kenneth Bomberg
*Assistant Examiner* — Brandon Lee
(74) *Attorney, Agent, or Firm* — Ostrolenk Faber LLP

(57) ABSTRACT

A method pertaining to a liquid supply system which supplies liquid to a feed device (230) via which liquid is supplied to at least one consumption point (250): Determining presence of air supplied upstream to the feed device (230), and, when presence of air is found, of reducing operating power of the feed device (230) compared with ordinary operation. Also a computer program product containing program code (P) for a computer (200; 210) for implementing the method. Also a device and a motor vehicle (100) which is equipped with the device.

15 Claims, 3 Drawing Sheets

(51) Int. Cl.
*F01N 11/00* (2006.01)
*F01N 3/10* (2006.01)
(52) U.S. Cl.
CPC .......... *F01N 3/208* (2013.01); *F01N 2610/02* (2013.01); *F01N 2610/14* (2013.01); *F01N 2610/1466* (2013.01); *F01N 2900/0416* (2013.01); *F01N 2900/1808* (2013.01); *F01N 2900/1822* (2013.01); *Y02T 10/24* (2013.01); *Y02T 10/47* (2013.01); *Y10T 137/0324* (2015.04); *Y10T 137/7722* (2015.04)
(58) Field of Classification Search
CPC ........ F01N 2610/02; F01N 9/00; F01N 3/208; F01N 3/2066; F01N 11/00; F01N 2610/1466; Y02T 10/24
USPC ...... 60/274, 286, 295, 296; 417/12, 44.2, 53
See application file for complete search history.

(56) References Cited

U.S. PATENT DOCUMENTS

| | | | |
|---|---|---|---|
| 6,375,432 B1* | 4/2002 | Krasny et al. | 417/46 |
| 6,470,673 B1 | 10/2002 | van Nieuwstadt et al. | 60/286 |
| 7,607,292 B2 | 10/2009 | Kobayashi | 60/286 |
| 8,302,394 B2* | 11/2012 | Ochi | 60/403 |
| 8,307,636 B2 | 11/2012 | Matsunaga | 60/286 |
| 2001/0020452 A1 | 9/2001 | Suzuki et al. | 123/41.1 |
| 2003/0161947 A1* | 8/2003 | Tuyls et al. | 427/240 |
| 2004/0060286 A1 | 4/2004 | Huber et al. | |
| 2007/0289289 A1 | 12/2007 | Kojima et al. | 60/280 |
| 2008/0022654 A1* | 1/2008 | Broderick | F01N 3/2066 60/274 |
| 2008/0245058 A1 | 10/2008 | Boddy et al. | 60/286 |
| 2009/0205316 A1 | 8/2009 | Dougnier et al. | 60/274 |
| 2011/0083424 A1* | 4/2011 | Wang et al. | 60/277 |
| 2013/0104527 A1 | 5/2013 | Liljestrand et al. | 60/274 |
| 2013/0111881 A1 | 5/2013 | Liljestrand et al. | 60/274 |
| 2013/0111882 A1 | 5/2013 | Eriksson et al. | 60/274 |
| 2013/0118153 A1 | 5/2013 | Liljestrand et al. | 60/274 |
| 2013/0125532 A1 | 5/2013 | Eriksson et al. | 60/274 |

FOREIGN PATENT DOCUMENTS

| | | |
|---|---|---|
| DE | 10 2004 050 022 | 4/2006 |
| DE | 10 2006 020 439 | 11/2007 |
| DE | 10 2007 000 666 | 7/2008 |
| DE | 10 2007 039 794 | 3/2009 |
| DE | 10 2008 030 756 A1 | 1/2010 |
| DE | 10 2008 052 988 | 4/2010 |
| JP | 58-210387 | 12/1983 |
| JP | 59-517 | 1/1984 |
| JP | H2-122906 | 10/1990 |
| JP | H6-159176 | 6/1994 |
| JP | H9-96212 | 4/1997 |
| JP | 2000-240436 | 9/2000 |
| JP | 2002-38941 | 2/2002 |
| JP | 2003-511599 | 3/2003 |
| JP | 2004-293494 | 10/2004 |
| JP | 2005-307769 | 11/2005 |
| JP | 2008-69731 | 3/2008 |
| JP | 2008-95570 | 4/2008 |
| JP | 2008169711 | 7/2008 |
| JP | 2008-220163 | 9/2008 |
| JP | 2009-006081 | 1/2009 |
| JP | 2009-526168 | 7/2009 |
| JP | 2010-133354 | 6/2010 |
| WO | WO 2007/091969 | 8/2007 |
| WO | WO 2007/124779 | 11/2007 |
| WO | WO 2007/124791 | 11/2007 |
| WO | WO 2008149541 A1 * | 12/2008 |
| WO | WO 2009/053806 | 4/2009 |
| WO | WO 2009156281 A1 * | 12/2009 |

OTHER PUBLICATIONS

International Preliminary Report on Patentability dated Sep. 21, 2012 issued in corresponding international patent application No. PCT/SE2011/050790.
International Search Report mailed Oct. 5, 2011 in corresponding PCT International Application No. PCT/SE2011/050786.
International Search Report mailed Oct. 11, 2011 in corresponding PCT International Application No. PCT/SE2011/050801.
International Search Report mailed Oct. 6, 2011 in corresponding PCT International Application No. PCT/SE2011/050789.
International Search Report mailed Oct. 6, 2011 in corresponding PCT International Application No. PCT/SE2011/050792.
International Search Report mailed Oct. 11, 2011 in corresponding PCT International Application No. PCT/SE2011/050802.
International Search Report mailed Oct. 11, 2011 in corresponding PCT International Application No. PCT/SE2011/050785.
English translation of Japanese Office Action dated Oct. 21, 2014 issued in JP 2013-516545.

* cited by examiner

METHOD PERTAINING TO AIR REMOVAL FROM A LIQUID SUPPLY SYSTEM AND A LIQUID SUPPLY SYSTEM

CROSS-REFERENCE TO RELATED APPLICATIONS

The present application is a 35. U.S.C. §§371 national phase conversion of PCT/SE2011/050790, filed Jun. 20, 2011, which claims priority of Swedish Application No. 1050641-8, filed Jun. 21, 2010, the contents of which are incorporated by reference herein. The PCT International Application was published in the English language.

TECHNICAL FIELD

The present invention relates to a method pertaining to a liquid supply system. The invention relates also to a computer programme product containing programme code for a computer for implementing a method according to the invention. The invention relates also to a liquid supply system and a motor vehicle which is equipped with the liquid supply system.

BACKGROUND

Vehicles today use, for example, urea as reductant in SCR (selective catalytic reduction) systems which comprise an SCR catalyst in which said reductant and NOx gas can react and be converted to nitrogen gas and water. Various types of reductants may be used in SCR systems. AdBlue is an example of a commonly used reductant.

One type of SCR system comprises a container which holds a reductant. The SCR system has also a pump adapted to drawing said reductant from the container via a suction hose and to supplying it via a pressure hose to a dosing unit situated adjacent to an exhaust system of the vehicle, e.g. adjacent to an exhaust pipe of the exhaust system. The dosing unit is adapted to injecting a necessary amount of reductant into the exhaust pipe upstream of the SCR catalyst according to operating routines which are stored in a control unit of the vehicle. To make it easier to regulate the pressure when there are small or no dosing amounts, the system comprises also a return hose which runs back to the container from a pressure side of the system. This configuration makes it possible to cool the dosing unit by means of the reductant which, during cooling, flows from the container via the pump and the dosing unit and back to the container. The dosing unit is thus provided with active cooling. The return flow from the dosing unit to the container may be substantially constant and is currently not controlled or regulated by means of appropriate valves or such units.

In certain conditions, air may enter the SCR system upstream of the pump. This may for example occur during start-up of the SCR system after its initial fitting, in which case there will be air in the suction hose.

Air may also enter the suction hose when the SCR system has used up all the available reductant in the container, in which case the container will be empty of reductant, the pump runs dry and air is drawn into it via the suction hose.

Another example is that air may enter the suction hose in situations where there is a limited amount of reductant left in the container in the SCR system and said SCR system moves in such a way that splashing occurs in the container, in which case air may be drawn into the pump via the suction hose.

A further example is that the suction hose may be incorrectly fitted to the pump such that air leakage occurs on the upstream side of the pump. Here again air may be drawn into the pump via the suction hose or at a faulty or damaged seal between the suction hose and the pump.

An example is that the suction hose may itself be frayed or defective in such a way as to allow air to be drawn into the pump via the hose.

Any air entering the pump on an inlet side of it will adversely affect the reductant flow in the SCR system, thereby reducing a cooling power of the dosing unit, with potential risk of overheating of temperature-sensitive components of the dosing unit.

Emissions of the SCR system may also be adversely affected by presence of air at the pump in that the reductant supply to the dosing unit will be limited.

Any presence of air at the pump in the SCR system adversely affects a working pressure of the dosing unit. Building up a normal working pressure of the SCR system also currently takes quite a long time when there is air in the pump.

There is thus a need to improve current SCR systems in order to reduce or eliminate the above disadvantages.

DE 102008030756 AI refers to detection of air downstream of a pump for supplying a dosing unit with reducing agent in an SCR system and for clearing gas bubbles etc. from a line between the pump and the dosing unit by means of reducing agent via a valve and a return line for leading reducing agent back to a reducing agent tank.

SUMMARY OF THE INVENTION

An object of the present invention is to propose a novel and advantageous method for improving the performance of a liquid supply system.

An object of the present invention is to propose a novel and advantageous method for improving the performance of an SCR system.

Another object of the invention is to propose a novel and advantageous liquid supply system and a novel and advantageous computer programme for improving the performance of a liquid supply system.

Another object of the invention is to propose a novel and advantageous SCR system and a novel and advantageous computer programme for improving the performance of an SCR system.

An object of the present invention is to propose a novel and advantageous method for reducing the amount of undesirable emissions in an SCR system when there is air in said SCR system.

A further object of the invention is to propose an alternative method pertaining to a liquid supply system and an alternative computer programme pertaining to a liquid supply system, and an alternative liquid supply system.

A further object of the invention is to propose an alternative method pertaining to an SCR system and an alternative computer programme pertaining to an SCR system, and an alternative SCR system.

Another object of the invention is to propose a method pertaining to a liquid supply system whereby a working pressure of the liquid can be built up more quickly than in the state of the art when there is air in a feed device.

Another object of the invention is to propose a method pertaining to an SCR system whereby a working pressure of the liquid can be built up more quickly than in the state of the art when there is air in a feed device.

These objects are achieved with a method pertaining to a liquid supply system whereby liquid is supplied to a feed device via which liquid is supplied to at least one consumption point from a container, as disclosed herein.

An aspect of the invention proposes a method pertaining to a liquid supply system whereby liquid is supplied to a feed device via which liquid is supplied to at least one consumption point from a container. The method comprises the steps of:

determining presence of air supplied upstream to the feed device, and when such presence is found, reducing an operating power of said feed device compared with ordinary operation.

Thus optimising the liquid supply system's start-up time in the presence of air supplied to the feed device means that NOx emissions can be reduced in certain applications where the liquid supply system is used to supply a reducing agent to an SCR system. Start-up time means a time from when air is found at the feed device to when a desired working pressure of the liquid supply system is reached.

To minimise the impact of air or air bubbles upon the liquid supply system, the innovative method may be applied to adjust an operating power of the feed device to a prevailing situation. If the operating power is reduced when there is air at the feed device, better efficiency can be achieved.

The method may further comprise the step of determining said presence of air on the basis of detected operating power of a power source which is adapted to powering said feed device, and/or on the basis of a detected delivery pressure of said feed device, and/or on the basis of a determined time during which deviant operation of the feed device takes place. Detecting behaviour of the feed device which is characterised by presence of air at the feed device makes it possible to reduce an operating power in order thereby to improve or optimise the liquid supply system's start-up time.

The method may further comprise the step of maintaining said reduced operating power until said presence of air is brought down to a desirable level. At said desirable level, a working pressure of the liquid supply system may revert to any desirable working pressure to allow effective cooling of the consumption point, e.g. a dosing unit for a reductant in an SCR system.

Said desirable level may be a predetermined level catering for a detected operating power of a power source which is adapted to powering said feed device, and/or catering for a detected delivery pressure of said feed device, and/or catering for a determined time during which running of the feed device at reduced operating power takes place.

The liquid supply system may be comprised by an SCR system. The liquid may be a reducing agent, e.g. AdBlue. The feed device may be a diaphragm pump. Said at least one consumption point may be a dosing unit.

The method may further comprise the step of reducing said operating power of said feed device by at least 40% compared with ordinary operation. An advantage of reducing said operating power of the feed device is that a smaller amount of energy is then needed to run it, while at the same time a higher efficiency of it is achieved. The method may alternatively comprise the step of reducing said operating power of said feed device by at least 20% compared with ordinary operation.

The method may further comprise the step of increasing the reduced operating power of said feed device in at least one stage, or by ramping, to any suitable operating power. After said presence of air has reached a desirable level during its operation at reduced power, the power of the feed device may be controlled in any suitable way. The result is a versatile solution to the above problem.

The method is easy to implement in existing motor vehicles. Software pertaining to a liquid supply system whereby liquid is supplied to a feed device via which liquid is supplied to at least one consumption point according to the invention may be installed in a control unit of the vehicle during the manufacture of the vehicle. A purchaser of the vehicle may thus have the possibility of selecting the function of the method as an option. Alternatively, software which comprises programme code for applying the innovative method pertaining to a liquid supply system whereby liquid is supplied to a feed device via which liquid is supplied to at least one consumption point may be installed in a control unit of the vehicle on the occasion of upgrading at a service station, in which case the software may be loaded into a memory in the control unit. Implementing the innovative method is therefore cost-effective, particularly as no further sensors or components need be installed in the vehicle. Relevant hardware is currently already provided in the vehicle. The invention therefore represents a cost-effective solution to the problems indicated above.

Software comprising programme code pertaining to a liquid supply system whereby liquid is supplied to a feed device via which liquid is supplied to at least one consumption point is easy to update or replace. Moreover, different parts of the software comprising programme code pertaining to a liquid supply system whereby liquid is supplied to a feed device via which liquid is supplied to at least one consumption point may be replaced independently of one another. This modular configuration is advantageous from a maintenance perspective.

An aspect of the invention proposes a method pertaining to an SCR system whereby reducing agent is supplied to a feed device via which reducing agent is supplied to at least one consumption point from a container. The method comprises the steps of:

determining presence of air supplied upstream to the feed device, and when such presence is found, reducing an operating power of said feed device compared with ordinary operation.

An aspect of the invention proposes a liquid supply system adapted to supplying liquid to a feed device which is itself adapted to supplying liquid to at least one consumption point from a container, which liquid supply system comprises:

means for determining presence of air supplied upstream to the feed device, and means for, when such presence is found, reducing an operating power of said feed device compared with ordinary operation.

The liquid supply system may further comprise means for determining said presence on the basis of detected operating power of a power source which is adapted to powering said feed device, and/or on the basis of a detected delivery pressure of said feed device, and/or on the basis of a determined time during which deviant operation of the feed device takes place.

The liquid supply system may further comprise means for maintaining said reduced operating power until said presence is brought down to a desirable level.

Said desirable level may be a predetermined level catering for a detected operating power of a power source which is adapted to powering said feed device, and/or catering for a detected delivery pressure of said feed device, and/or catering for a determined time during which running at reduced operating power of the feed device takes place.

The liquid supply system may further comprise means for reducing said operating power of said feed device by at least 40% compared with ordinary operation.

The liquid supply system may further comprise means for increasing the reduced operating power of said feed device in at least one stage, or by ramping, to any suitable operating power.

The above objects are also achieved with a motor vehicle which comprises the features of the liquid supply system. The vehicle may be a truck, bus or passenger car.

An aspect of the invention proposes an SCR system adapted to supplying reducing agent to a feed device which is itself adapted to supplying reducing agent to at least one consumption point from a container, which SCR system comprises:
  means for determining presence of air supplied upstream to the feed device, and
  means for, when such presence is found, reducing an operating power of said feed device compared with ordinary operation.

An aspect of the invention proposes a computer programme pertaining to a liquid supply system whereby liquid is supplied to a feed device via which liquid is supplied to at least one consumption point, which programme contains programme code stored on a computer-readable medium for causing an electronic control unit or another computer connected to the electronic control unit to perform steps according to the disclosure herein.

An aspect of the invention proposes a computer programme product containing a programme code stored on a computer-readable medium for performing method steps according to the disclosure herein when said programme is run on an electronic control unit or another computer connected to the electronic control unit.

An aspect of the invention proposes a method pertaining to an SCR system whereby reducing agent is supplied to a feed device via which reducing agent is supplied to at least one consumption point from a container. The method comprises the steps of:
  determining presence of air supplied upstream to the feed device, and
  when such presence is found, reducing an operating power of said feed device compared with prevailing operation.

An aspect of the invention proposes an SCR system adapted to supplying reducing agent to a feed device which is itself adapted to supplying reducing agent to at least one consumption point from a container, which SCR system comprises:
  means for determining presence of air supplied upstream to the feed device, and
  means for, when such presence is found, reducing an operating power of said feed device compared with ordinary operation.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognize further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE DRAWINGS

Figure 1:
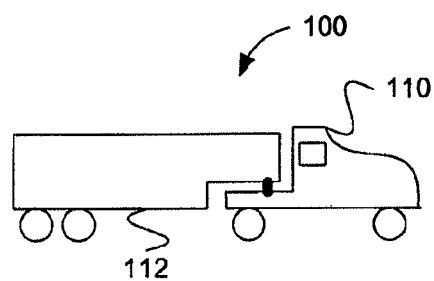
FIG. 1 illustrates schematically a vehicle according to an embodiment of the invention.

FIG. 1 depicts a side view of a vehicle 100. The exemplified vehicle 100 comprises a tractor unit 110 and a trailer 112. The vehicle may be a heavy vehicle, e.g. a truck or a bus. The vehicle may alternatively be a passenger car.

It should be noted that the invention is applicable to any SCR system and is therefore not restricted to SCR systems of motor vehicles. The innovative method and the innovative liquid supply system according to an aspect of the invention are well suited to other platforms which have an SCR than motor vehicles, e.g. watercraft. The watercraft may be of any kind, e.g. motorboats, steamers, ferries or ships.

The innovative method and the innovative liquid supply system according to an aspect of the invention are also well suited to, for example, systems which comprise industrial engines and/or engine-powered industrial robots.

The innovative method and the innovative liquid supply system according to an aspect of the invention are also well suited to various kinds of power plants, e.g. an electric power plant comprising a diesel generator.

The innovative method and the innovative liquid supply system are well suited to any engine system which comprises an engine and an SCR system, e.g. on a locomotive or some other platform.

The innovative method and the innovative device are well suited to any system which comprises an $NO_x$ generator and an SCR system.

It should be noted that the liquid supply system may be any liquid supply system, although it is herein exemplified as a liquid supply system pertaining to an SCR system of a vehicle. The feed device may be any desired feed device and need not be a diaphragm pump as herein described.

The liquid of the liquid supply system may be any suitable fluid, e.g. water, any aqueous solution, oil, e.g. lubricating oil, fruit juice, fuel, e.g. petrol, ethanol or diesel fuel, any desired reducing agent, e.g. AdBlue etc.

The term "link" refers herein to a communication link which may be a physical connection such as an optoelectronic communication line, or a non-physical connection such as a wireless connection, e.g. a radio link or microwave link.

The term "line" refers herein to a passage for holding and conveying a fluid, e.g. a reductant in liquid form. The line may be a pipe of any size. The line may be made of any suitable material, e.g. plastic, rubber or metal.

The term "reductant" or "reducing agent" refers herein to an agent used for reacting with certain emissions in an SCR system. These emissions may for example be NOx gas. The terms "reductant" and "reducing agent" are herein used synonymously. Said reductant according to a version is so-called AdBlue. Other kinds of reductants may of course be used. AdBlue is herein cited as an example of a reductant, but specialists will appreciate that the innovative method and the innovative device are feasible with other types of reductants, subject to necessary adaptations, e.g. adaptations to adequate freezing points for chosen reductants, in control algorithms for executing software code in accordance with the innovative method.

Figure 2:
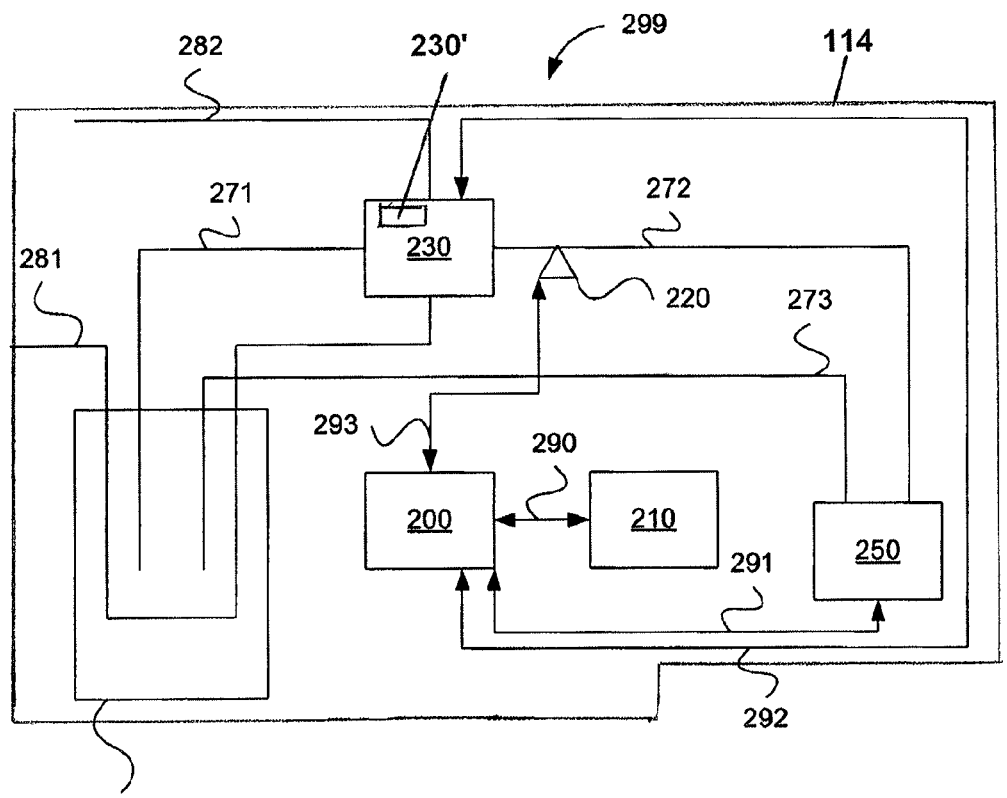
FIG. 2 illustrates schematically a subsystem for the vehicle depicted in FIG. 1, according to an embodiment of the invention.

FIG. 2 depicts a subsystem 299 of the vehicle 100. The subsystem 299 is situated in the tractor unit 110. The subsystem 299 may form part of an SCR system. The subsystem 299 consists according to this example of a container 205 arranged to hold a reductant. The container 205 is adapted to containing a suitable amount of reductant and to being replenishable as necessary. The container may accommodate, for example, 75 or 50 liters of reductant.

A first line 271 is adapted to leading the reductant to a pump 230 from the container 205. The pump 230 may be any suitable pump. The pump 230 may be a diaphragm pump provided with at least one filter. The pump 230 is adapted to being driven by an electric motor. The pump 230 is adapted to drawing the reductant from the container 205 via the first line 271 and supplying it via a second line 272 to a dosing unit 250. The dosing unit 250 comprises an electrically controlled dosing valve by means of which a flow of reductant added to the exhaust system can be controlled. The pump 230 is adapted to pressurising the reductant in the second line 272. The dosing unit 250 is provided with a throttle unit against which said pressure of the reductant is built up in the subsystem 299. This pressure is herein referred to as the working pressure of the liquid supply system.

The dosing unit 250 is adapted to supplying said reductant to an exhaust system (not depicted) of the vehicle 100. More specifically, the dosing unit 250 is adapted to supplying a suitable amount of reductant in a controlled way to an exhaust system of the vehicle 100. According to this version, an SCR catalyst (not depicted) is situated downstream of a location in the exhaust system where the reductant supply is effected. The amount of reductant supplied in the exhaust system is intended to be used in a conventional way in the SCR catalyst in order to reduce the amount of undesirable emissions in a known way.

The dosing unit 250 is situated adjacent to, for example, an exhaust pipe which is adapted to leading exhaust gases from a combustion engine (not 30 30 depicted) of the vehicle 100 to the SCR catalyst. The dosing unit 250 is situated in thermal contact with the exhaust system of the vehicle 100. This means that thermal energy stored in, for example, an exhaust pipe, silencer, particle filter and SCR catalyst can thus be led to the dosing unit.

The dosing unit 250 is provided with an electronic control card which is adapted to handling communication with a control unit 200. The dosing unit 250 comprises also plastic and/or rubber components which might melt or be otherwise adversely affected as a result of too high temperatures.

The dosing unit 250 is sensitive to temperatures above a certain value, e.g. 120 degrees Celsius. As for example the exhaust pipe, the silencer and the SCR catalyst of the vehicle 100 exceed this temperature value, there is risk that the dosing unit might become overheated during or after operation of the vehicle if not provided with cooling.

A third line 273 runs between the dosing unit 250 and the container 205. The third line 273 is adapted to leading back to the container 205 a certain amount of the reductant fed to the dosing valve 250. This configuration achieves with advantage cooling of the dosing unit 250. The dosing unit 250 is thus cooled by a flow of the reductant when it is pumped through it from the pump 230 to the container 205.

A first radiator liquid line 281 is adapted to holding and conveying coolant for an engine of the vehicle 100. The first radiator liquid line 281 is partly situated in the container 205 in order to warm the reductant present therein if the reductant is cold. In this example, the first radiator liquid line 281 is adapted to leading radiator liquid which has been warmed by the vehicle's engine in a closed circuit through the container 205, via the pump 230 and a second radiator liquid line 282 back to the engine of the vehicle 100. According to a version, the first radiator liquid line 281 is configured with a substantially U-shaped portion situated in the container 205, as schematically depicted in FIG. 2. This configuration achieves improved warming of the reductant in the container 205 when the reductant is at too low a temperature to function in a desirable way. It should be noted that the first radiator liquid line 281 may be of any suitable configuration. If the reductant is at a temperature which exceeds a predetermined value, warming of the reductant by the radiator liquid is deactivated automatically.

A first control unit 200 is arranged for communication with a pressure sensor 220 via a link 293. The pressure sensor 220 is adapted to detecting a prevailing pressure of the reductant where the sensor is fitted. According to this version, the pressure sensor 220 is situated adjacent to the second line 272 in order to measure a working pressure of the reductant downstream of the pump 230. The pressure sensor 220 is adapted to continuously sending signals to the first control unit 200 which contain information about a prevailing pressure of the reductant.

The first control unit 200 is arranged for communication with the pump 230 via a link 292. The first control unit 200 is adapted to controlling operation of the pump 230 in order for example to regulate the reductant flows within the subsystem 299. The first control unit 200 is adapted to controlling an operating power of the pump 230 by regulating its associated electric motor.

The first control unit 200 is adapted to determining a prevailing operating power of the pump's electric motor, which operating power may be altered in response to presence of air at the pump 230. If air enters the first line 271, a supply current to the pump is altered on the basis thereof. The first control unit 200 is adapted to monitoring the pump 230 in order to be able to detect behaviour which is due to presence of air at the feed device. In a similar way, the first control unit 200 is adapted to monitoring a working pressure of the reductant in order to be able to detect behaviour which is due to presence of air at the feed device.

The first control unit 200 is arranged for communication with the dosing unit 250 via a link 291. The first control unit 200 is adapted to controlling operation of the dosing unit 250 in order for example to regulate the reductant supply to the exhaust system of the vehicle 100. The first control unit 200 is adapted to controlling operation of the dosing unit 250 in order for example to regulate the reductant return supply to the container 205.

The first control unit 200 is adapted, according to a version, to using the signals received which contain a prevailing pressure of the reductant in the region of the pressure sensor 220 as a basis for controlling the pump 230 in accordance with an aspect of the innovative method. In particular, according to a version, the first control unit 200 is adapted to using the signals received which contain a prevailing pressure of the reductant in the region of the pressure sensor 220 as a basis for controlling operation of the pump 230 at reduced power compared with ordinary operation when there is found to be air at the inlet of the pump 230 or in the pump 230, in accordance with an aspect of the innovative method.

The first control unit 200 is adapted, according to a version, to using the signals received from the pump 230 which contain information about a prevailing actual operating power of the pump 230 as a basis for controlling said pump 230 in accordance with an aspect of the innovative method. In particular, the first control unit 200 is adapted, according to a version, to using the signals received which contain a prevailing actual operating power of the pump 230 as a basis for controlling the latter's operation at reduced power compared with ordinary operation when there is found to be air at the inlet of the pump 230 or in the pump 230, in accordance with an aspect of the innovative method.

A second control unit 210 is arranged for communication with the first control unit 200 via a link 290. The second control unit 210 may be detachably connected to the first control unit 200. The second control unit 210 may be a control unit external to the vehicle 100. The second control unit 210 may be adapted to performing the innovative method steps according to the invention. The second control unit 210 may be used to cross-load software to the first control unit 200, particularly software for applying the innovative method. The second control unit 210 may alternatively be arranged for communication with the first control unit 200 via an internal network in the vehicle. The second control unit 210 may be adapted to performing substantially similar functions to those of the first control unit 200, e.g. using the signals received which contain a prevailing pressure of the reductant in the region of the pressure sensor 220 as a basis for controlling operation of the pump 230 at reduced power compared with ordinary operation when there is air at the pump 230. The innovative method may be applied by the first control unit 200 or the second control unit 210, or by both the first control unit 200 and the second control unit 210.

Figure 3A:
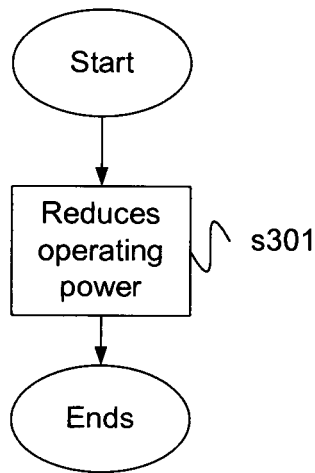
FIG. 3a is a schematic flowchart of a method according to an embodiment of the invention.

FIG. 3a is a schematic flowchart of a method pertaining to a liquid supply system whereby liquid is supplied to a feed device via which liquid is supplied to at least one consumption point from a container, according to an embodiment of the invention. The method comprises a first step s301. Method step s301 comprises the steps of determining presence of air supplied upstream to the feed device, and, when such presence is found, of reducing an operating power of said feed device compared with ordinary operation. The method ends after step s301.

Figure 3B:
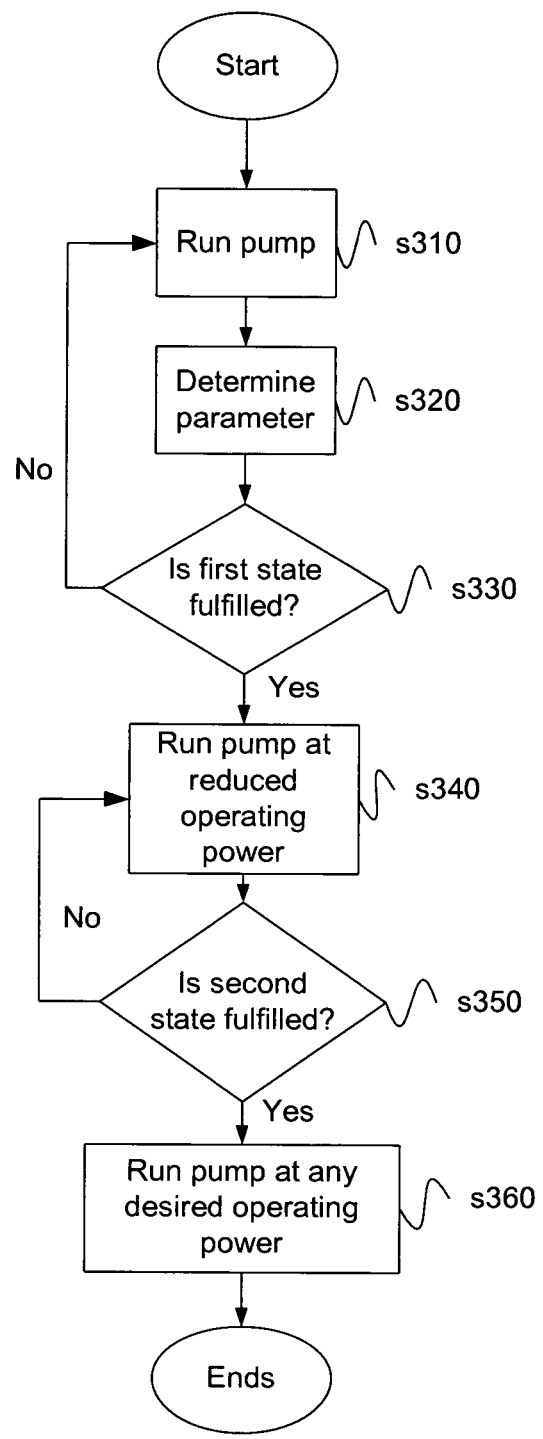
FIG. 3b is a more detailed schematic flowchart of a method according to an embodiment of the invention.

FIG. 3b is a schematic flowchart of a method pertaining to a liquid supply system whereby liquid is supplied to a feed device via which liquid is supplied to at least one consumption point from a container, according to an embodiment of the invention.

The method comprises a first step 310. Method step s310 comprises the step of initiating operation of the pump 230. The pump 230 is then run as in ordinary operation. According to an example, the pump 230 is run at an operating power which is substantially maximum in prevailing circumstances. According to an example, an operating power in ordinary operation corresponds to any suitable level in prevailing circumstances of the SCR system. Said any suitable level during ordinary operation may be a predetermined level. Step s310 is followed by a step s320.

Method step s320 comprises the step of determining a value for at least one operating parameter. This operating parameter may for example be a prevailing working pressure of the SCR system's reductant. Another operating parameter might be an actually prevailing operating power of the pump 230. Step s320 is followed by a step s330.

Method step s330 comprises the step of using the value for the at least one parameter as a basis for deciding whether a first state is fulfilled. The first state may be a state characterised by presence of air at the pump 230. The first state may be a state which comprises presence of air supplied to the pump 230. According to an example it may be decided that the first state is fulfilled if a prevailing working pressure of the SCR system's reductant is altered from a value which represents working pressure during ordinary operation to a value which is below a predetermined value. According to another example it may be decided that the first state is fulfilled if an actually prevailing operating power of the pump 230 is altered from a value which represents an operating power of it during ordinary operation to a value which is below a predetermined value. If the first state is fulfilled, a subsequent step s340 is performed. If the first state is not fulfilled, step s310 is performed again.

Method step s340 comprises the step of reducing an operating power of the pump 230 compared with the operating power initiated at step s310. Step s340 is followed by a step s350.

Method step s350 comprises the step of determining whether a second state is fulfilled. The second state may be a state characterised by substantially no presence of air at the pump 230. The second state may be a state characterised by presence of a substantially acceptable amount of air at the pump 230. The second state may be a state which comprises substantially no presence of air supplied to the pump 230. If the second state is fulfilled, a subsequent step s360 is performed. If the second state is not fulfilled, step s340 is performed again.

Method step s360 comprises the step of running the pump 230 at any suitable operating power. According to a version, the operating power of the pump 230 may be controlled to an initial level, as indicated at step s310, in one or more discrete stages. According to a version the operating power of the pump 230 may be controlled to an initial level, as indicated at step s310, by ramping. According to a version, the operating power of the pump 230 may be maintained at the reduced level for any suitable period of time and thereafter be increased, where appropriate, to any suitable level. According to a version the operating power of the pump 230 may be controlled to a level which is below said reduced level, at least temporarily, and thereafter be controlled, where appropriate, to any suitable higher level, e.g. said initial level. The method ends after step s360.

Figure 4:
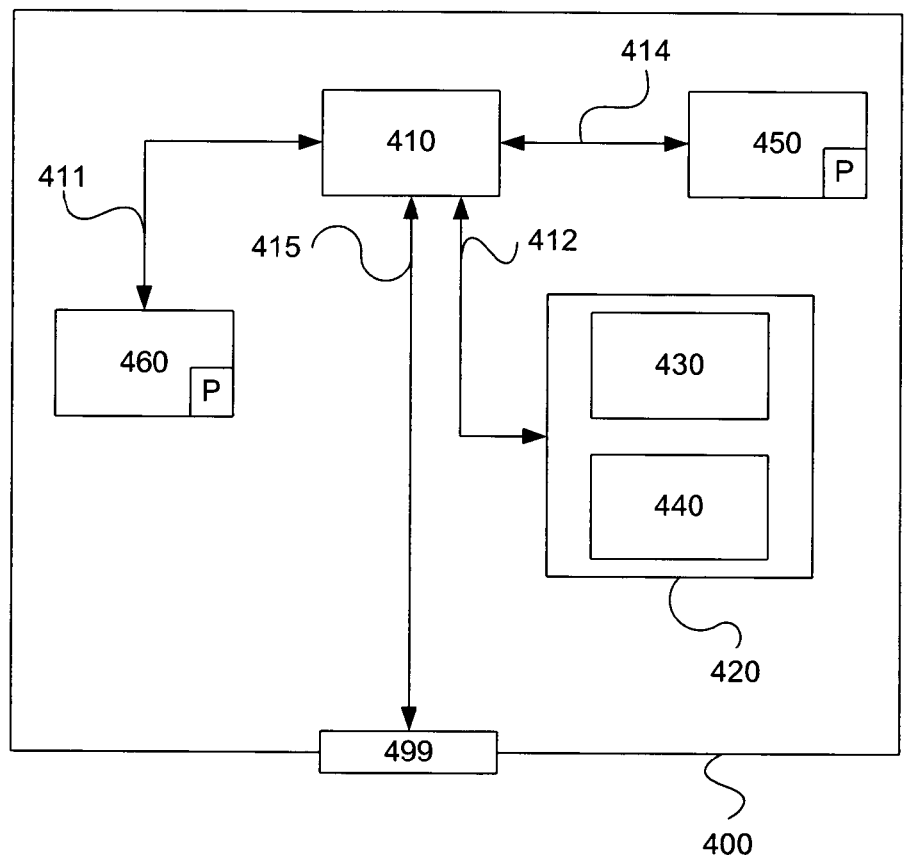
FIG. 4 illustrates schematically a computer according to an embodiment of the invention.

FIG. 4 is a diagram of a version of a device 400. The control units 200 and 210 described with reference to FIG. 2 may in a version comprise the device 400. The device 400 comprises a non-volatile memory 420, a data processing unit 410 and a read/write memory 450. The non-volatile memory 420 has a first memory element 430 in which a computer programme, e.g. an operating system, is stored for controlling the function of the device 400. The device 400 further comprises a bus controller, a serial communication port, I/O means, an ND converter, a time and date input and transfer unit, an event counter and an interruption controller (not depicted). The non-volatile memory 420 has also a second memory element 440.

A proposed computer programme P comprises routines for the purposes, where liquid, e.g. reducing agent, is supplied to a feed device via which liquid is supplied to at least one consumption point from a container, of determining presence of air supplied upstream to the feed device and, when such presence is found, of reducing an operating power of said feed device compared with ordinary operation according to the innovative method. The programme P comprises routines for maintaining said reduced operating power until said presence is brought down to a desirable level. The programme P comprises routines for reducing said operating power of said feed device by at least 40% compared with ordinary operation, in accordance with the innovative method. The programme P may be stored in an executable form or in a compressed form in a memory 460 and/or in a read/write memory 450.

Where the data processing unit 410 is described as performing a certain function, it means that the data processing unit 410 effects a certain part of the programme stored in the memory 460, or a certain part of the programme stored in the read/write memory 450.

The data processing device 410 can communicate with a data port 499 via a data bus 415. The non-volatile memory 420 is intended for communication with the data processing unit 410 via a data bus 412. The separate memory 460 is intended to communicate with the data processing unit 410 via a data bus 411. The read/write memory 450 is adapted to communicating with the data processing unit 410 via a data bus 414. The data port 499 may for example have the links 290, 292 and 293 connected to it (see FIG. 2).

When data are received on the data port 499, they are stored temporarily in the second memory element 440. When input data have been temporarily stored, the data processing unit 410 is prepared to effect code execution as described above. According to a version, signals received on the data port 499 contain information about actually prevailing operating power of the pump 230. According to a version, signals received on the data port 499 contain information about a prevailing working pressure of the reductant.

The signals received on the data port 499 may be used by the device 400 to determine presence of air supplied to the pump 230 and, when such presence is found, to at least temporarily reduce an operating power of said pump compared with ordinary operation.

Parts of the methods herein described may be effected by the device 400 by means of the data processing unit 410 which runs the programme stored in the memory 460 or the read/write memory 450. When the device 400 runs the programme, methods herein described are executed.

An aspect of the invention proposes a computer programme pertaining to a liquid supply system whereby liquid is supplied to a feed device via which liquid is supplied to at least one consumption point from a container, which programme contains programme code stored on a computer-readable medium for causing an electronic control unit or another computer connected to the electronic control unit to perform steps according to any of claims 1-10.

An aspect of the invention proposes a computer programme pertaining to an SCR system whereby reducing agent is supplied to a feed device via which reducing agent is supplied to at least one consumption point from a container, which programme contains programme code stored on a computer-readable medium for causing an electronic control unit or another computer connected to the electronic control unit to perform steps according to any of claims 1-10.

An aspect of the invention proposes a computer programme pertaining to an SCR system whereby reducing agent is supplied to a feed device via which reducing agent is supplied to at least one consumption point from a container, which programme contains programme code for causing an electronic control unit or another computer connected to the electronic control unit to perform steps according to any of claims 1-10.

The foregoing description of the preferred embodiments of the present invention is provided for illustrative and descriptive purposes. It is not intended to be exhaustive nor to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method of operating a liquid supply system of an SCR exhaust system comprising:
   providing a container, an electric pump and a supply line to supply liquid from the container to the electric pump via the supply line, the pump supplying the liquid back to the container and to the exhaust system via a dosing unit that includes a dosing valve;
   operating the pump at a predetermined power level;
   detecting presence of air supplied upstream of the pump with a pressure sensor, and determining presence of air supplied upstream of the pump with a control unit; and
   operating the pump at a reduced power by reducing an operating power of the pump to a level below the predetermined level in response to detecting presence of air supplied upstream of the pump; and
   maintaining the reduced operating power of the pump while supplying liquid to the exhaust system and back to the container via the dosing unit until no longer the detected presence of air is present.

2. A method according to claim 1, wherein the desirable level corresponds to one of a predetermined operating power for the pump and a predetermined working pressure of the liquid supplied by the pump.

3. A method according to claim 1, wherein the liquid is a reducing agent.

4. A method according to claim 1, wherein the pump is a diaphragm pump.

5. A method according to claim 1, further comprising reducing the operating power supplied to the pump by at least 40%, compared to the predetermined level.

6. A method according to claim 1, further comprising increasing the reduced operating power supplied to the pump in at least one stage, or by ramping, to any suitable operating power.

7. A liquid supply system for supplying liquid to an exhaust system, the system comprising:
   an electric pump operable to transmit liquid from a container and operable to supply liquid to the exhaust system via a dosing valve of a dosing unit, and from the dosing unit back to the container;
   a liquid supply line connected to the electric pump and to the dosing unit to supply liquid from the pump to the exhaust system via the dosing valve;

another liquid supply line connected to the dosing unit and the container to supply liquid from the dosing unit to the container, and a control device including a data processor is configured to determine the presence of air supplied upstream of the pump by detecting presence of air supplied upstream of the pump via a pressure sensor;

the control device is further configured to operate the pump at a predetermined power level;

the control device is further configured to reduce an operating power supplied to the electric pump to a level below the predetermined level in response to determination of the presence of air supplied upstream of the pump, the control device is further configured to maintain the reduced operating power until no longer the determined presence of air is present while supplying liquid to the exhaust system and back to the container, wherein the electric pump receives power at the predetermined level to supply liquid to the dosing valve via the supply line, and the electric pump, the liquid supply line, the another liquid supply line and the dosing valve are connected in a configuration to supply liquid to the dosing valve via the liquid supply line, and to supply liquid to the container from the dosing unit via the another liquid supply line by the electric pump when the operating power supplied to the electric pump is reduced below the predetermined level.

8. A liquid supply system according to claim 7, in which the desirable level corresponds to one of a predetermined operating power of the pump and predetermined working pressure of the liquid supplied by the pump.

9. A liquid supply system according to claim 7, wherein the liquid is a reducing agent.

10. A liquid supply system according to claim 7, wherein the pump is a diaphragm pump.

11. A liquid supply system according to claim 7, wherein the control device reduces the operating power of the pump by at least 40% compared with the predetermined level.

12. A liquid supply system according to claim 7, wherein the control device increases the reduced operating power supplied to the pump in at least one stage, or by ramping, to any suitable operating power.

13. A vehicle comprising a liquid supply system according to claim 7 and a motor vehicle.

14. A motor vehicle according to claim 13, wherein the motor vehicle is selected from a group consisting of a truck, a bus and passenger car.

15. A system comprising the liquid supply system of claim 7, wherein the system is an SCR system.

* * * * *